(12) United States Patent
Takahashi et al.

(10) Patent No.: US 7,948,528 B2
(45) Date of Patent: May 24, 2011

(54) GAIN CALCULATING DEVICE

(75) Inventors: Kazunobu Takahashi, Kanagawa (JP); Sumito Yoshikawa, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/714,673

(22) Filed: Mar. 1, 2010

(65) Prior Publication Data

US 2010/0149374 A1 Jun. 17, 2010

Related U.S. Application Data

(62) Division of application No. 11/531,319, filed on Sep. 13, 2006, now abandoned.

(30) Foreign Application Priority Data

Jan. 5, 2006 (JP) ................................. 2006-000831

(51) Int. Cl.
*H04N 9/73* (2006.01)
*H04N 9/68* (2006.01)
*G06K 9/00* (2006.01)

(52) U.S. Cl. .................. 348/223.1; 348/225.1; 348/234; 382/167

(58) Field of Classification Search .... 348/223.1–225.1, 348/370, 371, 234; 382/167
See application file for complete search history.

(56) References Cited

U.S. PATENT DOCUMENTS

| 6,727,942 | B1 * | 4/2004 | Miyano ...................... 348/223.1 |
| 6,739,767 | B2 | 5/2004 | Ikeda et al. |
| 7,307,656 | B2 | 12/2007 | Takei |
| 2002/0122120 | A1 * | 9/2002 | Hsieh ............................ 348/231 |
| 2006/0152603 | A1 * | 7/2006 | Enge et al. ..................... 348/234 |

FOREIGN PATENT DOCUMENTS

| JP | 04-326888 | 11/1992 |
| JP | 2000-092509 | 3/2000 |
| JP | 2003-244467 | 8/2003 |

* cited by examiner

*Primary Examiner* — Lin Ye
*Assistant Examiner* — Mekonnen Dagnew
(74) *Attorney, Agent, or Firm* — Peyton C. Watkins

(57) ABSTRACT

A more preferable WB gain is calculated during strobe illuminated photography. When a WB gain for an image captured through strobe illuminated photography is calculated, the degree of contribution of strobe light is first estimated. When the degree of contribution is estimated, the image is first divided into a plurality of blocks, and typical brightness values and typical color values of the respective blocks are determined (S23). Subsequently, the highest-brightness block among the blocks analogous to the color of strobe light is identified as a strobe color block (S26). When there is a strobe color block, the degree of contribution of strobe light is estimated on the basis of the position of the strobe color block, a difference between the brightness of the strobe color block and the brightnesses of other blocks, and the like (S32 to S48). Meanwhile, when there is no strobe color block, the degree of contribution is estimated on the basis of the position of the highest-brightness block having the highest typical brightness value among the plurality of blocks (S28, S30).

2 Claims, 10 Drawing Sheets

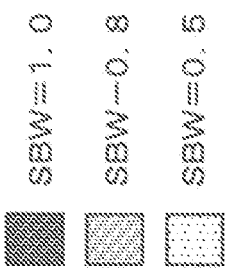
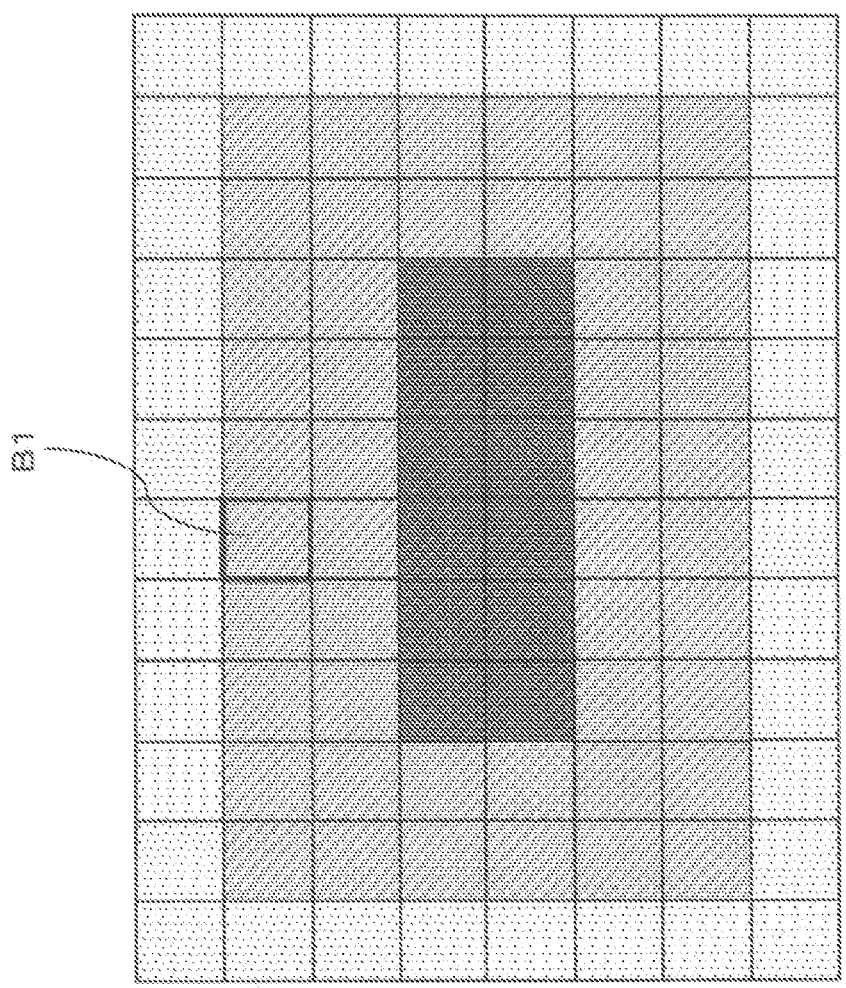
Fig. 6

GAIN CALCULATING DEVICE

CROSS REFERENCE TO RELATED APPLICATIONS

This is a Divisional of application Ser. No. 11/531,319 filed Sep. 13, 2006 now abandoned which claims the benefit of Japanese Patent Application No. 2006-831 filed on Jan. 5, 2006, which is incorporated herein by reference in its entirety.

BACKGROUND OF THE INVENTION

1. Field of the Invention

The present invention relates to a gain calculating device for calculating a white balance gain suitable for at least an image captured through strobe illuminated photography.

2. Related Art

In the field of cameras, there has been widely known a white balance technique for correcting the color of a captured image according to the type of a light source employed at the time of capture of the image, and the like. This technique is an image processing technique for eliminating a discrepancy between an impression which a photographer had during photographing action and an impression given by an output image, which is caused by the color of the light source employed during photography.

A technique for taking into consideration, during such white balance processing, whether or not strobe light has been fired during photographing action has hitherto been known. For instance, Japanese Patent Laid-Open Publication No. 2000-92509 describes calculation of a white balance gain by use of a strobe standard value previously set for strobe illuminated photography upon notification of tiring of a strobe light. According to this technique, a strobe standard value is always constant, regardless of the degree of contribution of strobe light to a subject. Therefore, when strobe light has not sufficiently reached the subject or when strobe light has been radiated with excessive intensity on the subject, there arises a problem of a failure to compute an appropriate white balance gain.

Accordingly, there has hitherto been practiced a technique of estimating, during strobe illuminated photography, the degree of contribution of strobe light, the degree of contribution of an ambient light source, the degree of contribution of strobe light, and the like; and adjusting a white balance gain according to the thus-estimated degrees of contribution and the like. For instance, Japanese Patent Laid-Open Publication No. Hei-4-326888 describes a technique for determining whether or not strobe light reaches a subject, on the basis of a distance to the subject. When the strobe light is determined not to be able to reach the subject, a preset value of a white balance is made selectable. Further, Japanese Patent Laid-Open Publication No. 2003-244467 describes a technique of detecting an area where a degree of mixing of ambient light and flash light is larger than a predetermined value, on the basis of information about ambient light existing during photographing action (the type of an ambient light source and the like), information about flash light employed (luring photographing action (presence/absence of flash light, the intensity of flash-reflected light, and the like), and the like. On the basis of a ratio of the detected area to the entire area, specifics of image processing, such as white balance processing, and the like, are determined. According to these conventional techniques, even when an image has been photographed by strobe light, the degree of mixing of strobe light (i.e., the degree of contribution of strobe light) is taken into consideration. Hence, a comparatively-appropriate white balance gain can be acquired.

However, any of these conventional techniques involves estimating the degree of contribution of strobe light from information extracted from factors other than a captured image such as a distance to a subject and information about flash light. Therefore, the conventional techniques cannot be said to have a high degree of precision in estimating the degree of contribution of strobe light. The low degree of precision in estimating the degree of contribution of strobe light poses difficulty in performing white balance processing suitable for strobe illuminated photography.

SUMMARY OF THE INVENTION

Accordingly, the present invention provides a gain calculating device capable of calculating a white balance gain suitable for strobe illuminated photography.

The present invention provides a gain calculating device for calculating a white balance gain at least for an image captured through strobe illuminated photography, the device comprising:

a block dividing unit for dividing the image captured through strobe illuminated photography into a plurality of blocks;

an identification unit for identifying, from among the divided blocks, a highly-influenced block; i.e., a block presumed to have been greatly influenced by strobe light;

first estimation unit for estimating, as a degree of first contribution, a degree of contribution of strobe light on the basis of at least one of the position of the highly-influenced block and a difference between brightness of the highly-influenced block and brightness of other blocks; and a gain calculating unit for calculating a white balance gain from at least the degree of first contribution.

In a preferred mode, the block dividing unit divides an image captured through strobe illuminated photography into a plurality of blocks and calculates typical brightness values of the respective divided blocks as typical brightness values; and the identification unit identifies, as a highly-influenced block, a block among the divided blocks having a large typical brightness value.

In another preferred mode, the block dividing unit divides an image captured through strobe illuminated photography into a plurality of blocks and calculates typical values of color values of the respective divided blocks as typical color values; and the identification unit identifies, as a highly-influenced block, a block among the divided blocks having a typical color value close to the color of strobe light. In this case, the block dividing unit preferably calculates typical brightness values of the respective divided blocks as typical brightness values; and the identification unit preferably identities, as a highly-influenced block, a block having a large typical brightness value having typical color values close to the color of strobe light among the blocks.

In still another preferred mode, a first estimation unit estimates the degree of contribution of strobe light on the basis of at least a difference between a typical brightness value of a highly-influenced block and a typical brightness value of the highest-brightness block having a high typical brightness value among other blocks.

In yet another preferred mode, a first estimation unit estimates the degree of contribution of strobe light on the basis of at least the position of a highly-influenced block. In this case, a first estimation unit preferably calculates the degree of contribution of strobe light as a smaller value with increasing distance of the highly-influenced block from an area where a main subject is presumed to be present. Further, an area where a main subject is presumed to be present is preferably at least in the vicinity of a center of an image or at an AF detection point designated by a user. The size of an area where a main subject is presumed to be present is preferably changed on the basis of at least one of a zooming factor and a distance to a subject.

In still another preferred mode, a first estimation unit estimates the degree of contribution of strobe light on the basis of at least a difference between a typical brightness value of a highly-influenced block and a mean brightness value of a plurality of blocks estimated to be comparatively unexposed to strobe light. In this case, the plurality of blocks estimated to be comparatively unexposed to strobe light preferably correspond to either of blocks located around the center of an image, blocks located around an AF detection point designated the user, or blocks located around the highly-influenced block.

In yet another preferred mode, the gain calculating device further comprises a second estimation unit for estimating the degree of contribution of strobe light as the degree of second contribution on the basis of a distance to a subject; and gain calculating unit for calculating a white balance gain on the basis of at least the degree of first contribution and the degree of second contribution. In another preferred mode, the gain calculating device further comprises a third estimation unit for estimating the degree of contribution of strobe light as the degree of third contribution on the basis of a difference between environment brightness achieved before firing of strobe light and environment brightness achieved after firing of strobe light; and gain calculating unit for calculating a white balance gain on the basis of at least the degree of first contribution and the degree of third contribution.

The present invention also provides a gain calculating device for calculating a white balance gain at least for an image captured through strobe illuminated photography, the device comprising:

a first brightness acquisition unit for acquiring environment brightness achieved before firing of strobe light as prefiring brightness;

a second brightness acquisition unit for acquiring environment brightness achieved at the time of firing of strobe light as tiring brightness;

an estimation unit for estimating, as the degree of third contribution, the degree of contribution of strobe light on the basis of a difference between the prefiring brightness and the firing brightness; and a calculating unit for calculating a white balance gain on the basis of at least the degree of third contribution. In this case, the first brightness acquisition unit desirably acquires, as prefiring brightness, a mean brightness value of a preview image acquired before firing of strobe light.

According to the present invention, the degree of contribution of strobe light is assumed on the basis of an actually-captured image, and hence a highly-reliable degree of contribution of strobe light is obtained. Consequently, a more preferable white balance gain can be obtained.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein:

FIG. 6 shows an example table of the degree of tentative contribution according to a position;

DETAILED DESCRIPTION OF THE PREFERRED EMBODIMENTS

Figure 1:
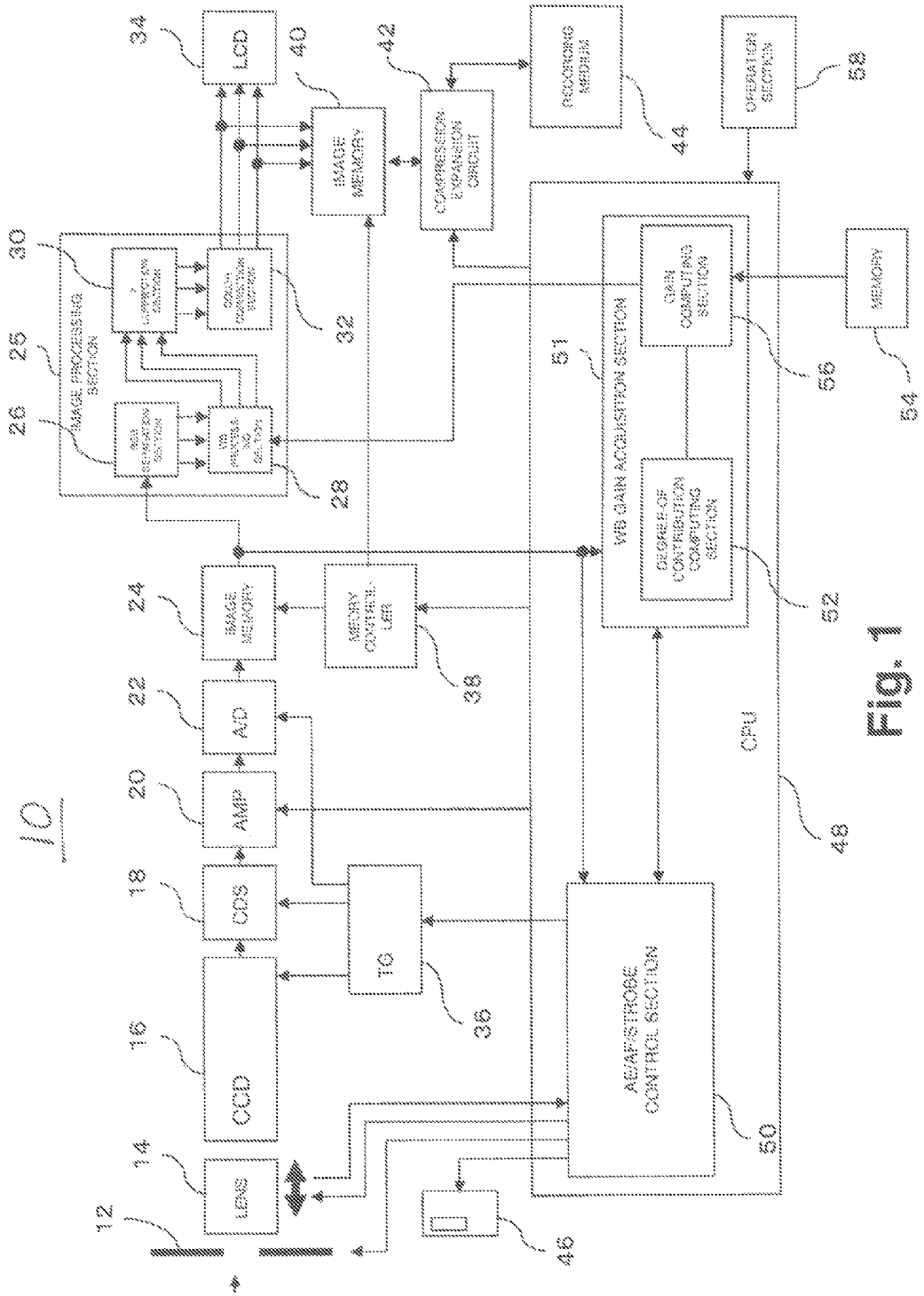
FIG. 1 is a block diagram showing the configuration of a digital camera which is an embodiment of the present invention.

An embodiment of the present invention will be hereinbelow described by reference to the drawings. FIG. 1 is a block diagram showing the configuration of a digital camera 10 which is an embodiment of the present invention. Light from a field (hereinafter simply called "light"), which has entered by way of an aperture member 12 and a lens 14, comes into a focus on a CCD 16, which is an image-capturing device. The amount of opening of the aperture member 12 and the amount of movement of the lens 14 are controlled by a CPU 48. The CCD 16 converts the input light into an electrical signal, and outputs the thus-converted electrical signal as captured-image data. Timing at which the CCD 16 performs photoelectric conversion is controlled by the CPU 48 via a timing generator (TG) 36. The CCD 16 always stores and sweeps electric charges at given intervals in order to acquire a preview image to be displayed on an LCD 34. Moreover, when a user's command for capturing an image is input, photoelectric conversion for acquiring a preview image is temporarily interrupted. After electric charges have been accumulated with elapse of an exposure time required to capture an actual image, electric charges are swept.

An electric signal output from the CCD 16 is converted into digital data by unit of an analog-to-digital (A/D) converter 22 after having undergone predetermined analogue signal processing performed by a correlated double sampling (CDS) circuit 18 and amplification processing performed by an amplifying (AMP) circuit 20. The digital data are temporarily stored as image data in image memory 24.

The image data temporarily stored in the image memory 24 are output to an image processing section 25 and a WB (White Balance) gain acquisition section 51. In the image processing section 25, an RGB separation section 26 separates the image data into three color components; an R component, a G component, and a B component. The separated data are sequentially sent to a WB processing section 28, a γ correction section 30, and a color correction section 32, where the data are subjected to predetermined image processing. Of these sections, the WB processing section 28 multiplies corresponding color component data by three types of WB gains computed by the WB gain acquisition section 51, which will be described later; namely, an R gain, a G gain, and a B gain, thereby performing WB processing.

The image data having undergone image processing are output to the LCD 34 and image memory 40. A memory controller 38 controls driving of the image memory 40 and the previously-described image memory 24. The LCD 34 electrically displays the image data having undergone image processing. The image data displayed on the LCD 34 include a preview image and a captured image recorded in a recording medium 44 to be described later. When the preview image is displayed, the LCD 34 acts as an electric finder which displays images in a field (hereinafter simply called "images") that can be captured. When a captured image recorded in the recording medium 44 is displayed, the LCD 34 functions as a playback monitor for playing back and displaying a captured image.

The image data temporarily stored in the image memory 40 are subjected to compression processing performed by a compression-and-expansion circuit 42, and the thus-compressed image data are recorded in the recording medium 44. The image data recorded in the recording medium 44 are subjected to expansion processing performed by the compression-and-expansion circuit 42 in accordance with a command from the user, and the thus-expanded data are displayed on the LCD 34. Upon glancing at a display on the LCD 34, the user can ascertain details of the captured image. An operation section 58 is an interface which receives a command from the user. The CPU 48 controls driving of individual sections in accordance with the user command input via the operation section 58.

A strobe device 46 fires strobe light toward a field in order to compensate for a deficiency in the amount of light of the field. Firing timing of the strobe device 46 and the amount of light tired by the strobe light 46 are controlled by an AE/AF/strobe control section 50.

The AE/AF/strobe light control section 50 calculates environment brightness and a distance to a subject from a value detected by an unillustrated AE sensor, a value detected by a range sensor, the amount of zoom designated by the user, and the like, thereby calculating exposure, the amount of movement of the lens 14, firing timing of a strobe, the amount of radiated light, and the like. The timing of the TG 36 is controlled on the basis of the obtained amount of exposure, and the like; and driving the lens 14 is controlled according to the amount of actuation of the lens. Further, the strobe device 46 is controlled on the basis of the timing of firing of strobe light and the amount of fired light.

The WB gain acquisition section 51 calculates a WB gain used for previously-described WB gain processing. The WB gain acquisition section 51 is roughly divided into a degree-of-contribution computing section 52 and a gain computing section 56. The gain computing section 56 computes a WB gain from the captured image data and a reference gain table stored in the memory. When an image is captured through strobe illuminated photography, a WB gain is calculated in consideration of the degree of contribution of the strobe light calculated by the degree-of-contribution computing section 52. When an image is captured through strobe illuminated photography, the deuce-of-contribution computing section 52 estimates the degree of contribution of strobe light to the field. Calculation of the WB gain and flow of calculation of the degree of contribution will be described in detail later.

Respective main programs and data, which are required to control the digital camera 10, are stored in memory 54. A gain table; i.e., a table of reference gain values which are required to calculate a WB gain according to the type of a light source, is also set in the memory 54. The previously-described WB gain computing section 56 computes a WB gain by reference to a reference gain table stored in the memory 54. This reference gain table will also be described in detail later.

Figure 2:
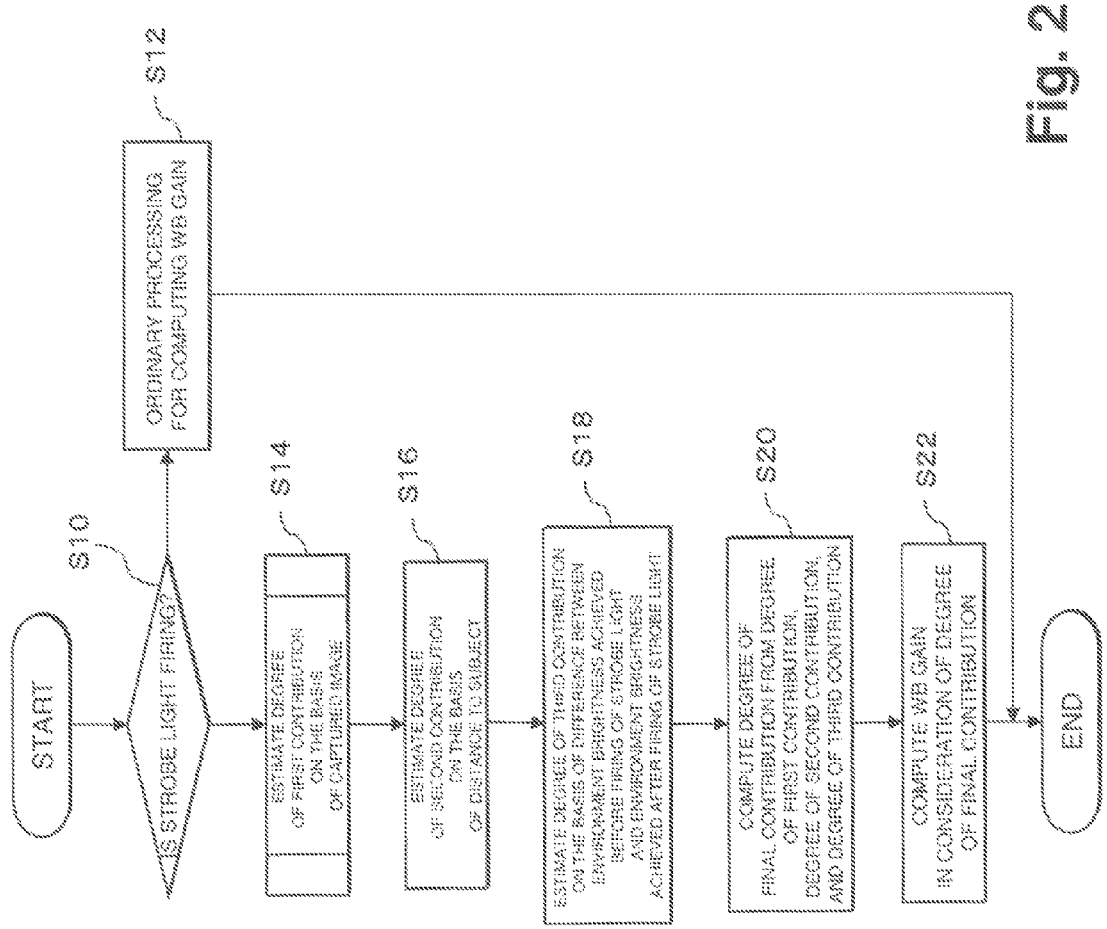
FIG. 2 is a flowchart showing flow of calculation of a WB gain.

There will now be described the flow of calculation of a WB gain performed by the digital camera 10. FIG. 2 is a flowchart showing the flow of calculation of a WB gain. When a WR gain is computed, a determination is first made, during photography of an image, as to whether or not strobe light has been tired (S10). Firing/nonfiring of strobe light can be determined on the basis of a control signal output from the AE/AF/strobe control section 50. When strobe light has not been fired, a WB gain is calculated through ordinary WB gain calculation processing (S12). Various known techniques can be utilized for the flow of calculation of a WB gain, and hence will be described briefly herein.

Figure 3:
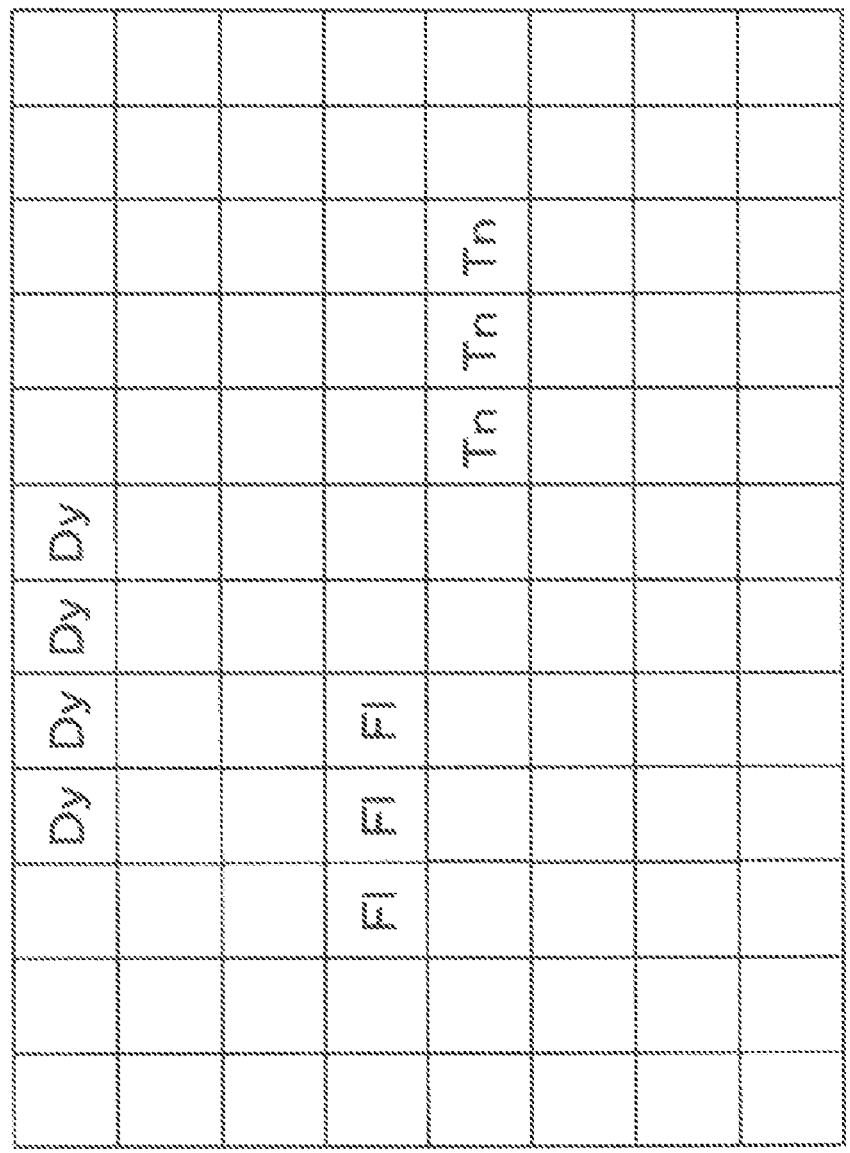
FIG. 3 is a view showing an example result of determination of a light source.

When a WB gain of an image for which strobe light has not been fired is calculated, a captured image is first divided into a plurality of blocks, and a typical color value and a typical brightness value, both belonging to each of the blocks, are computed as a typical color value and a typical brightness value. The type of a light source of each block is specified on the basis of the thus-obtained typical color value of the block. The degrees of reliability of the respective blocks are also calculated from the brightness values and the like. As long as the type of the light source and the degree of reliability can have been calculated, a value is added to the degree of reliability of each block according to the type of the light source, and the thus-added value is taken as a weighting coefficient for the type of a light source. For instance, the light sources of respective blocks are assumed to be determined as shown in FIG. 3. In FIG. 3, reference symbol Dy denotes a block determined to have been exposed to daylight; F1 denotes a block determined to have been exposed to fluorescent light; and Tri denotes a block determined to have been exposed to tungsten light. For the sake of brevity, the degrees of reliability of all blocks are presumed to assume a value of one. In this case, the weighting coefficient of daylight corresponds to the number of daylight blocks; namely, four. Similarly, the weighting coefficient of fluorescent light assumes a value of three, and the weighting coefficient of tungsten light assumes a value of three.

Figure 4:
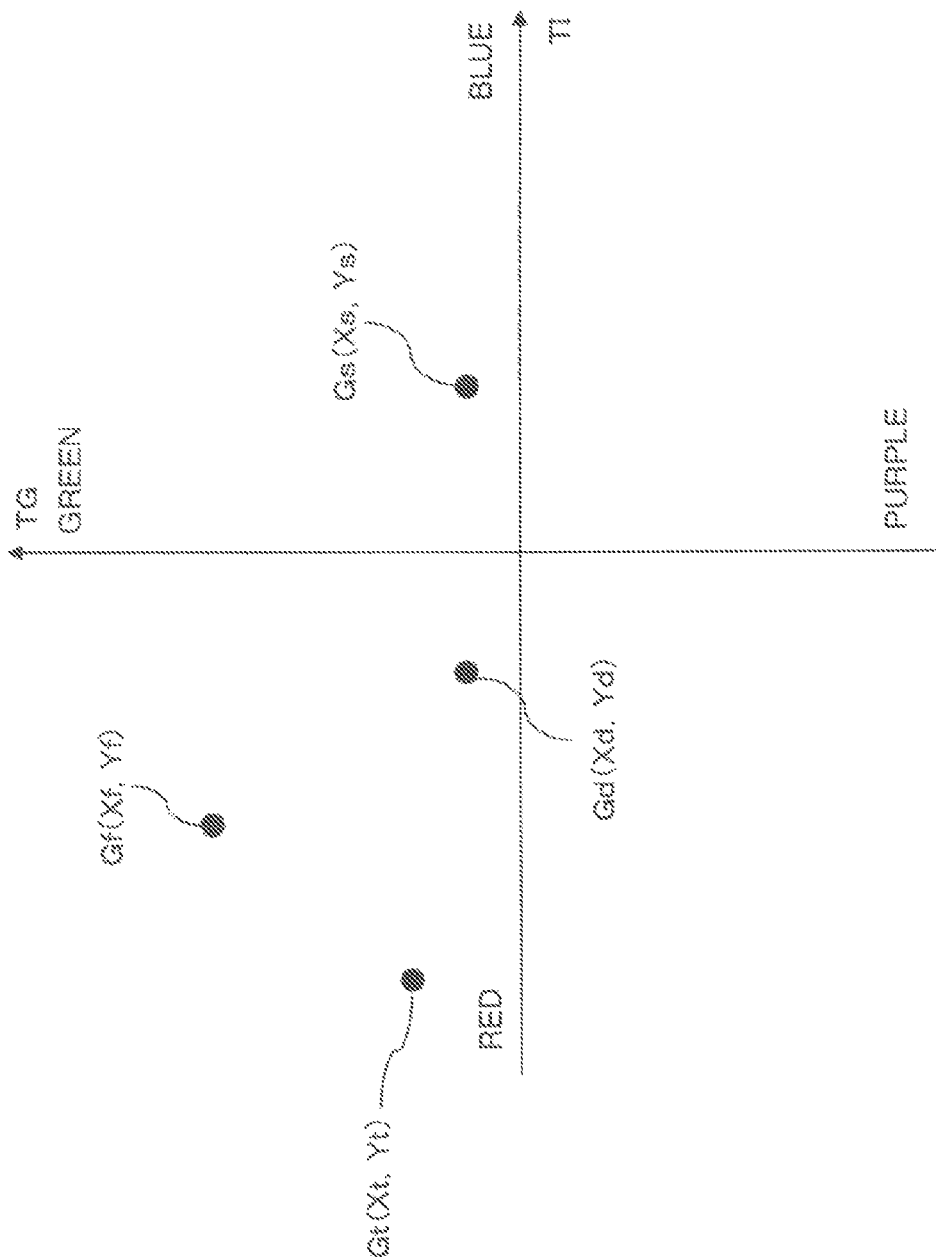
FIG. 4 is a view showing an example reference gain table.

As long as the weighting coefficient have been calculated, there is determined a weighted mean value of the reference gain values set in the reference gain table for respective types of light sources and the weighting coefficients. As shown in FIG. 4, the reference gain table is one where appropriate reference gain values are set according to the type of light source. In FIG. 4, reference symbol Gs denotes a reference gain value of strobe light; Gd denotes a reference gain value of daylight; Gt denotes a reference gain value of tungsten light; and Gf denotes a reference gain value of light of a fluorescent lamp. In FIG. 4, the reference gain values for respective types of light sources are represented as coordinates in a color space called a T space. When the color expressed by an RGB value is converted into coordinates in the T space, the following formula is employed.

$$\begin{pmatrix} Tl \\ Tg \\ Ti \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix}$$

where T1 denotes the brightness of a block, and Tg, Ti denote color differences among blocks. In T space, a color is expressed while Tg is taken as the vertical axis and Ti is taken as the horizontal axis. The matrix of linear conversion employed herein is a mere example, and another matrix may also be employed.

When a WB gain is calculated, there is determined a weighted mean value between reference gain values of light sources of respective types expressed as coordinates in the T space and weighting coefficients of the light sources of respective types calculated on the basis of the captured image. This weighted mean value represents coordinates in the T space. A WB gain is obtained by converting, into an RGB value, the weighted mean value corresponding to the coordinates in the T space. In the embodiment shown in FIG. 3, the weighted mean value is determined by means of $(4 \cdot Gd + 3 \cdot Gt + 3 \cdot Gf)/7$. The thus-calculated coordinates in the T space are converted into an RGB value, whereby a WB gain is obtained.

As mentioned above, when strobe light has not been fired, a WB gain is calculated on the basis of the captured image and the reference gain table. Meanwhile, when strobe light has been fired, the degree of contribution of strobe light is estimated (S14, S16, S18) and is used to calculate the WB gain (S20, S22). The degree of contribution assumes a range from zero to one. The greater the degree of contribution of strobe light, the more closely the degree approaches one. Flow of calculation of the degree of contribution will be sequentially described. When strobe illuminated photography has been performed, the degree of first contribution BSC is first calculated on the basis of information contained in a captured image (S14).

Figure 5:
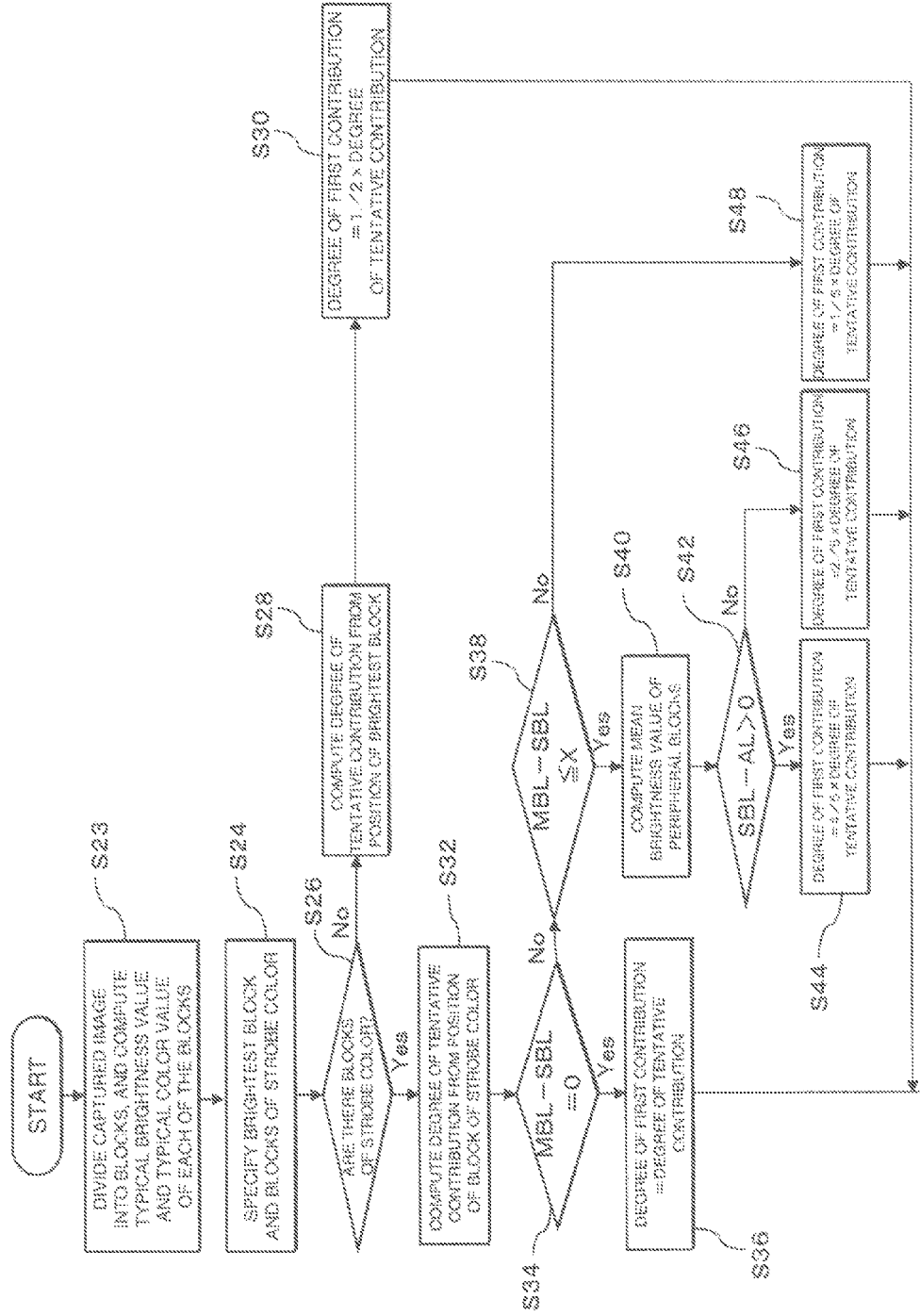
FIG. 5 is a flowchart showing now of calculation of the degree of a first contribution.

FIG. 5 is a flowchart showing flow of calculation of the degree of first contribution BSC. The degree of first contribution BSC is an estimation of the degree of contribution of strobe light on the basis of whether or not an intensively-exposed area, which has been intensively exposed to strobe light, is present in the captured image. Specifically, the captured image is first divided into a plurality of blocks, and typical values of brightness values and typical color values of the respective blocks are calculated as a typical brightness value and a typical color value (S23).

Subsequently, the highest-brightness block and a strobe color block are identified (S24). The highest-brightness block is a block having the highest typical brightness value among a plurality of blocks. Consequently, the highest-brightness block can be identified by means of comparing typical brightness values of the respective blocks with each other. Meanwhile, a strobe color block corresponds to a highly-influenced block that is presumed to be most significantly influenced by strobe light. Of one or more blocks having typical color values analogous to the color of strobe light, a block having the largest typical brightness value is the strobe color block. Consequently, when the strobe color block is specified, blocks having typical color values analogous to the color of strobe light are identified from among the plurality of blocks. Since the color of strobe light is known, the essential requirement is to identify blocks having typical color values which differ from the known color within a predetermined allowable range. Of the thus-identified blocks, a block having the highest typical brightness value is taken as a strobe color block. This strobe color block can be presumed to be an area in the captured image, which has been intensively exposed to strobe light; namely, an intensively-exposed area. At this point in time, the strobe color block is identified from only the brightness values and the color values. Hence, a definite determination cannot be made as to whether or not the strobe color block (the highly-influenced block) is a actual intensively-exposed area. Accordingly, the degree of contribution is calculated from the position of the strobe color block and a difference between the brightness of the strobe color block and the brightnesses of the other blocks.

There may be a case where the block having the highest typical brightness value and the block having the highest typical color value among the blocks having typical color values close to the color of strobe light are not single but plural. In this case, among the plurality of blocks, blocks close to the center of the image are preferably identified as the highest-brightness blocks and the strobe color blocks.

When the strobe color block and the highest-brightness block are present (S26), the degree of tentative contribution SBW is calculated from the position of the strobe color block (S32). The degree of tentative contribution SBW is a value which becomes a reference for calculation of the degree of first contribution SBC, and is temporarily calculated.

In many cases, a main subject is present in the vicinity of the center of the captured image. When strobe light has been fired, a neighborhood of the center of the captured image where the main subject is present is presumed to be most intensively exposed. Put another way, if the strobe color block is an actual intensively-exposed area, the strobe color block is likely to be located in the vicinity of the center of the captured image. Conversely, when the strobe color block is located in the vicinity of an edge of the image, the chance of the strobe color block being an intensively-exposed area is low; and, by extension, the degree of influence of strobe light being imposed on the field is said to be low.

In the present embodiment, the more the actually-identified strobe color block is distant from the center of the image, the lower the chance of strobe light having reached a subject is considered to be, and the degree of tentative contribution SBW is made small. A table such as that shown in FIG. 6 can be utilized for calculation of the degree of tentative contribution SBW. FIG. 6 is an example table of the degrees of tentative contribution SBW appropriate to the positions. In the example table shown in FIG. 6, the degree of tentative contribution SBW of the most intensively-colored block is taken as one, and the degree of tentative contribution SBW of the next intensively-colored block is taken as 0.8. The degree of tentative contribution SBW of the most lightly-colored block is taken as 0.5. Such a table has been prepared in advance, and the locations of the actually-identified strobe color blocks and the values of the thus-prepared table are compared with each other, thereby enabling calculation of the degree of tentative contribution SBW. For instance, the location of the actually-identified strobe color block is assumed to be B1 in FIG. 6. In this case, the degree of tentative contribution SBW is 0.8.

The table of the degrees of tentative contribution SBW corresponding to the positions may also be changed, as required, according to the distance to the subject and the zooming factor. Specifically, the range made up of the main subject reflecting strobe light is changed, as appropriate, according to the distance to the subject and the zooming factor. As long as the table of the degree of tentative contribution is changed according to a change in the range made up of the main subject, a more reliable degree of first contribution BSC is considered to be obtained. Some cameras can designate an AF detection point; namely, a location where focus is obtained. Such cameras may be provided with a table where the degree of tentative contribution SBW becomes smaller as a distance between a block and the AF detection point designated by the user increases.

When the degree of tentative contribution SBW has been obtained, the typical brightness value MBL of the highest-brightness block is compared with the typical brightness value SBL of the strobe color block, thereby determining a difference between the brightnesses (S34). There is a high chance of the brightness of an area intensively exposed to strobe light; namely, the brightness of an intensively-exposed area, becoming highest in the captured image. Put another way, when the typical brightness value SBL of the strobe color block is highest in the captured image, the strobe color block can be said to be an intensively-exposed area with high possibility. The degree of contribution of strobe light can also be presumed to be high.

Therefore, in the present embodiment, the typical brightness value MBL: of the highest-brightness block is compared with the typical brightness value SBL, of the strobe color block. When the difference between the typical brightness values of both blocks is zero; in other words, no difference exists between the typical brightness values of both blocks, the strobe color block can be said to be the highest-brightness block in the captured image. In this case, there is a high possibility of the strobe color block being an intensively-exposed area, and the degree of contribution of strobe light can be presumed to be high. Accordingly, in the case of MBL=SBL the previously-calculated degree of tentative contribution SBW is set as the degree of first contribution BSC (S36).

Meanwhile, when the typical brightness value SBL of the strobe color block is smaller than the typical brightness value MBL of the highest-brightness block, the chance of the strobe color block being an intensively-exposed block is considered to be low. When a point light source having high brightness is coincidentally present in the field and when the area of the point light source has been identified as the highest-brightness block, the chance of the strobe color block being the intensively-exposed block cannot necessarily be said to be low. There is a sufficient possibility of a point light source, which is higher than the strobe light in terms of brightness, having been identified as the highest-brightness block regardless of the strobe light having sufficiently reached the field.

When the typical brightness value SBL of the strobe color block is smaller than the typical brightness value MBL of the highest-brightness block (MBL>SBL), an additional determination is made as to whether or not the strobe color block is an intensively-exposed area. Specifically, processing proceeds to step S38, where a determination is made as to whether or not the difference between the typical brightness values falls within a predetermined allowable range X. When the difference between the typical brightness values is comparatively large and when the difference is out of the predetermined allowable range (MBL−SBL>X), the chance of the strobe color block being an intensively-exposed block can be said to be low. In this case, the degree of contribution of strobe light is presumed to be low, and hence a value determined by rendering significantly small the previously-calculated degree of tentative contribution SBW; e.g., a value of one-fifth of the degree of tentative contribution SBW, is calculated as the degree of first contribution BSC (S48).

Figure 7:
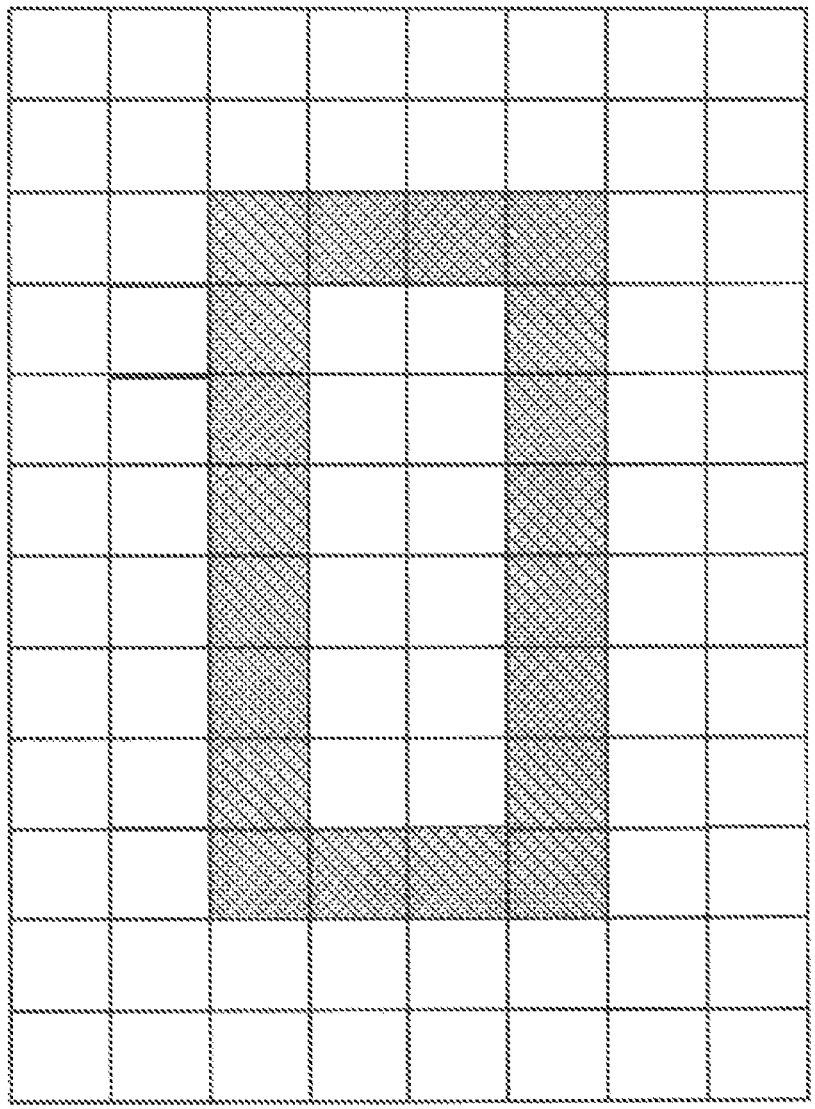
FIG. 7 shows an example peripheral block.

Meanwhile, when a difference between the typical brightness value MBL of the highest-brightness block and the typical brightness value SBL of the strobe color block is comparatively small and when the difference falls within a predetermined allowable range (MBL−SBL≦X), an average brightness level AL of peripheral blocks is calculated (S40). The term "peripheral blocks" means a plurality of blocks which are comparatively unexposed to strobe light. As mentioned previously, the main subject is presumed to be intensively exposed to strobe light, and the main subject is presumed to be located in the vicinity of the center of the captured image. Consequently, the blocks which are comparatively unexposed to strobe light are presumed to be located at positions slightly away from the center of the captured image; e.g., locations hatched in FIG. 7. In the present embodiment, positions of such peripheral blocks have previously been predicted, and an average value of typical brightness values of the predicted blocks is calculated as an average brightness value AL of the peripheral blocks. Identifying a plurality of blocks are identified as peripheral blocks and calculating the average brightness level AL of the blocks are intended for lessening the influence of the point light source. Specifically, when only a single block is identified as a peripheral block, there may arise a case where the area of a point light source, which is coincidentally present, is identified as single peripheral block. In this case, the periphery of the main subject is erroneously ascertained as high brightness. However, as a result of a plurality of blocks being identified and a mean brightness value of the blocks being calculated, the influence of such a point light source can be lessened.

As long as the average brightness value AL of the peripheral blocks can be calculated, the average brightness value AL of the peripheral blocks and the typical brightness value SBL of the strobe color block are compared with each other (S42). Consequently, when the typical brightness value SBL of the strobe color block is greater than the calculated average brightness level AL of the peripheral blocks, a sufficient chance of the strobe color block being an intensively-exposed block can be said to be. In this case, a value of four-fifth of the calculated degree of tentative contribution SBW is calculated as the degree of first contribution BSC (S44).

When the typical brightness value SBL of the strobe color block is smaller than the average brightness value AL of the peripheral blocks, the chance of the strobe color block being an intensively-exposed block is said to be low. In this case, a value of two-fifth of the calculated degree of tentative contribution SBW is calculated as the degree of first contribution BSC (S46).

The position and size of the peripheral blocks may be changed as appropriate. Specifically, as mentioned previously, the area made up of the main subject changes according to the distance to the subject, the zooming factor, and the like. Consequently, changes in the positions and sizes of peripheral blocks which are comparatively unexposed to strobe light can be predicted. Accordingly, the positions and sizes of the peripheral blocks may be changed, as appropriate, according to the distance to a subject, the zooming factor, and the like. Moreover, when the user has designated the AF point, the positions of the peripheral blocks may be changed according to the designated point. In the present embodiment, the positions of the peripheral blocks are determined on the assumption that the main subject is present in the vicinity of the center of the image. However, the positions of the peripheral blocks may be determined on the assumption that the main subject is present around the strobe color block. Specifically, blocks located at positions slightly distant from the strobe color block may be taken as peripheral blocks.

Incidentally, all of the above-described flows are for the case where the strobe color block; namely, a block having a color analogous to that of strobe light, is present. However, there may be a case where a block analogous to the color of strobe light is not present at all in a captured image. In such case, the highest-brightness block is presumed to be an area intensively exposed to strobe light, the degree of first contribution BSC is calculated. Namely, in step S24, when, even if an attempt is made to identify a strobe color block, such a block is not present, processing proceeds to step S28. In step S28, the degrees of tentative contribution SBW are calculated on the basis of the position of the highest-brightness block. As in the case of step S32, the degrees of tentative contribution SBW are calculated in advance in accordance with the table where the degrees of tentative contribution SBW are set according to a position such as that shown in FIG. 6. The table shown in FIG. 6 is compared with the position of the identified highest-brightness block, thereby calculating the degree of tentative contribution SBW.

As long as the degree of tentative contribution SBW has been calculated on the basis of the position of the highest-brightness block, a value of one-half of the degree of tentative contribution SBW is calculated as the degree of first contribution BSC (S30). The reason why the degree of tentative contribution SBW is taken as one-half is because the possibility of the highest-brightness blocks being the intensively-exposed areas is high. Specifically, the intensively-exposed area that is intensively exposed to strobe light should originally assume a color analogous to the color of strobe light as well as being highly bright. Meanwhile, the highest-brightness blocks are highly bright, but colors of some highest-brightness blocks are not analogous to the color of strobe light. The possibility of such highest-brightness blocks being intensively-bright areas can be said to be low. Therefore, when strobe color blocks are not present, a value of one-half of the degree of tentative contribution SBW determined from the position of the highest-brightness block is calculated as the degree of first contribution BSC.

The flows of calculation of the degree of first contribution BSC have been described thus far. As is evident from the above descriptions, in the present embodiment, the degree of contribution of strobe light is presumed on the basis of specifics of the actually-captured image. Consequently, when compared with a conventional technique of estimating the degree of contribution from only various photographing conditions; e.g., luminous brightness of the flash, a distance to a subject, and the like, the degree of contribution with high reliability can be estimated, whereby a more preferable WB gain can be obtained.

Various specific numerals provided in the above descriptions; e.g., a value of four-fifth in step S44, a value of two-fifth in step S46, and the like, are mere examples, and can be changed as appropriate.

In the present embodiment, the typical brightness value SBL of the strobe color block is compared with the typical brightness value MBL, of the highly-bright blocks and the average brightness value AL of the peripheral blocks. As long as a determination can be made as to whether or not strobe light affects the strobe color portion of the image, another values may be compared. For instance, an average or a standard deviation of typical brightness values of all blocks having typical brightness values close to the color of strobe fight may also be used in lieu of the typical brightness values SBL of the strobe color blocks. Further, an average value or a standard deviation of typical brightness values of all blocks having typical brightness values which are greater than a predetermined threshold value or top several percentages of blocks having high typical brightness values, may also be used in place of the typical brightness value MBL of the highly-bright blocks. Moreover, a standard deviation of typical brightness values of the peripheral blocks may also be used in place of the average brightness value AL of the peripheral blocks.

In the present embodiment, among blocks having typical color values analogous to the color of strobe light, a block having the highest brightness (strobe color blocks) is taken as a block greatly influenced by strobe light; namely, a highly-influenced block. More simply, a block having the highest typical brightness value or a block having a typical color value analogous to the color of strobe light may be taken as a highly-influenced block. Among the plurality of divided blocks, a block having the highest typical brightness value may be identified as a highly-influenced block, and the degree of first contribution may be determined on the basis of the position of the highly-influenced block and a difference between the brightness of the highly-influenced block and the brightnesses of peripheral blocks. Alternatively, among the plurality of divided blocks, a block having typical color values analogous to the color of strobe light may be identified as a highly-influenced block, and the degree of first contribution may be estimated from the position of the highly-influenced block, a difference between the brightness of the highly-influenced block and the brightnesses of peripheral blocks, and a difference between the brightness of the highly-influenced block and the brightness of the highly-bright block. In this case, the strobe light is presumed to have hardly reached the subject unless there is a block having a typical color value analogous to the color of strobe light, and it is better to set the degree of first contribution BSC to a small value (e.g., 0.1 or the like). When there are a plurality of blocks having the highest typical brightness value or a plurality of blocks having typical color values analogous to the color of the strobe light, a block of the plurality of blocks that is closest to the center of the image is desirably identified as a highly-influenced block.

Figure 8:
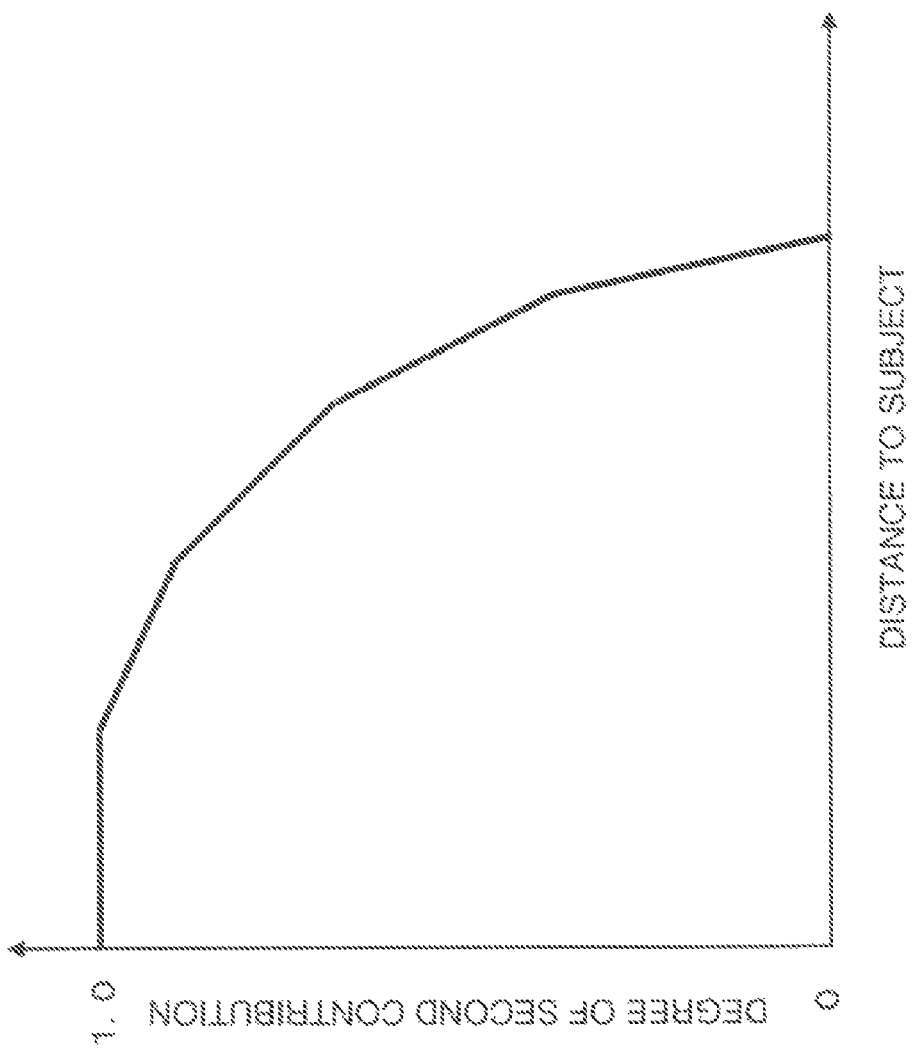
FIG. 8 is a view showing an example function between a distance to a subject and the degree of second contribution.

Turning back to FIG. 2, continued flow of calculation of the WB gain is now provided. As long as the degree of first contribution BSC can have been calculated, the degree of second contribution DW is continuously calculated from the distance to the subject (S16). The degree of second contribution DW is the degree of contribution of strobe light presumed on the basis of the distance to the subject. In general, the greater the distance to the subject, the smaller the degree of contribution of strobe light is predicted to become. Accordingly, as shown in FIG. 8, there is set a function between the distance to the subject and the degree of second contribution DW, by means of which the degree of second contribution DW becomes smaller as the distance to the subject increases. The distance to the subject detected by the range sensor during capture of an image is applied to the function shown in FIG. 8, to thus determine the degree of second contribution DW.

When the degree of second contribution DW has been determined, the degree of third contribution LW is successively presumed (S18). The degree of third contribution LW is the degree of contribution of strobe light estimated on the basis of the amount of difference between the environment brightness achieved before firing of strobe light and that achieved after firing of strobe light. In general, when the environment brightness has greatly changed before and after firing of strobe light, the degree of contribution of strobe light is considered to be high. Conversely, when a great change does not arise in environment brightness, the strobe light is presumed to hardly reach the subject or to provide the field with no influence. For these reasons, in the present embodiment, an average brightness value of the captured image acquired before firing of strobe light and an average brightness value of the captured image acquired during tiring of strobe light are calculated, and the degree of third contribution LW is calculated on the basis of the difference in brightness. A preview image can be used as an image captured before firing of strobe light. The preview image is captured at given intervals at all times. Therefore, if among the preview images, a preview image captured before firing of strobe light; namely, a preview image captured before a release switch is depressed all the way down, is used, an image captured before tiring of strobe light can be obtained.

Figure 9:
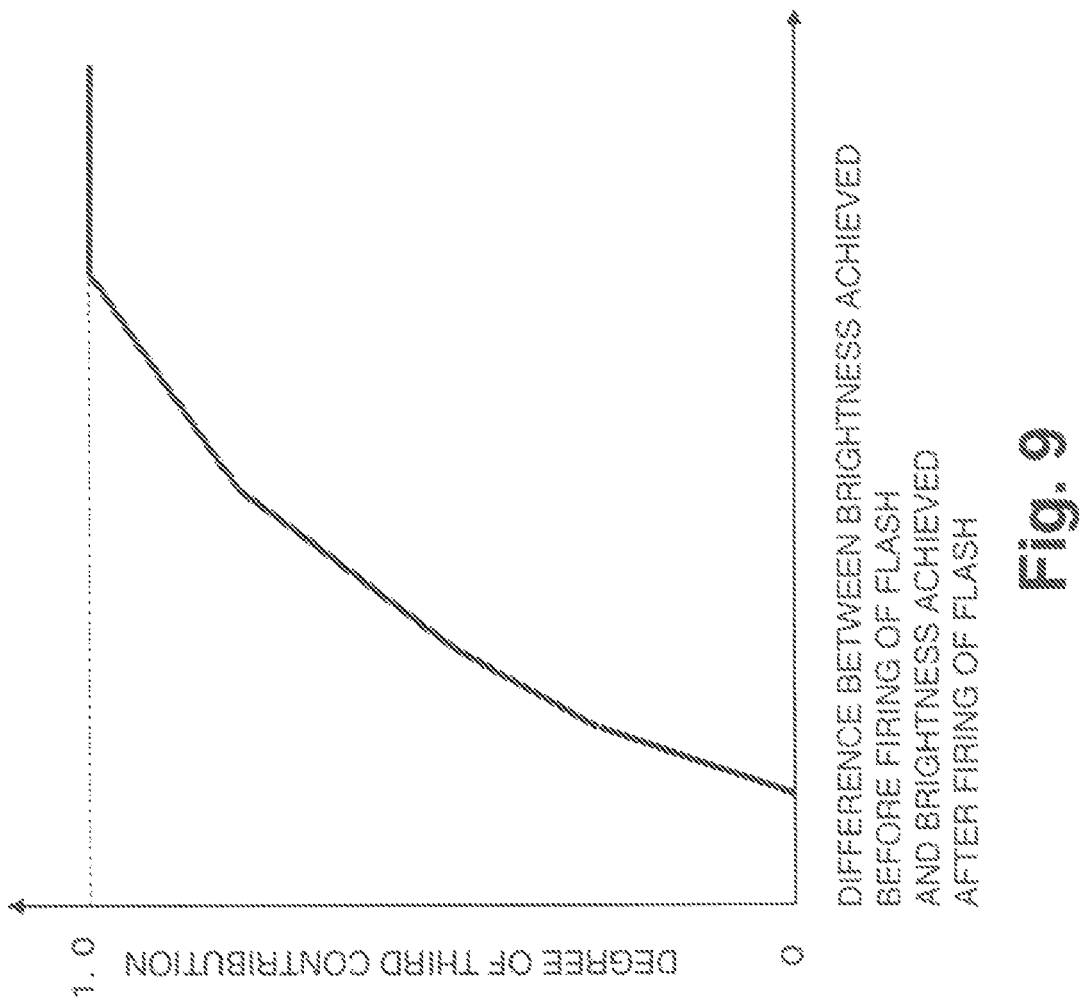
FIG. 9 is a view showing an example function between the degree of third contribution and a difference between environment brightness achieved before tiring of strobe light and that achieved after tiring of strobe light.

As long as the preview image acquired before firing of strobe light and the image captured during tiring of strobe light are obtained, the average brightness values of the respective images are calculated, to thus calculate a difference between the brightness values. The greater the difference in brightness, the greater the degree of contribution of strobe light is considered to be. Therefore, the degree of third contribution LW is calculated so as to become greater with an increase in brightness difference. Specifically, as shown in FIG. 9, a function—by means of which the degree of third contribution LW becomes greater with an increase in brightness difference—is set in advance. A difference between the average brightness value of the preview image and that of the image captured through strobe illuminated photography is applied to the function shown in FIG. 9, thereby calculating the degree of third contribution LW.

Like the degree of first contribution BSC, the degree of third contribution LW is the degree of contribution which is actually calculated on the basis of a captured image. Therefore, the degree of third contribution can be said to be higher in reliability than the conventional photographic conditions; for example, the degree of contribution determined solely from the illumination brightness of the flash, a distance to the subject, and the like. In the present embodiment, an average brightness value of the preview image is used as environment brightness achieved before firing of strobe light. As long as environment brightness acquired before tiring of strobe can be estimated, another value may also be used. For instance, a brightness value used for determining whether or not strobe light is to be fired; namely, an environment brightness value acquired before firing of strobe light, such as a brightness value which is a requirement for firing strobe light, may also be used.

When all of the first, second, and third degrees of contribution are determined, the final degree of contribution FSC is calculated from these three degrees of contribution (S20). Specifically, the degree of final contribution FSC assumes a value which is determined by adding together a product of the degree of first contribution BSC and the degree of second contribution DW and a product of the degree of first contribution BSC and the degree of third contribution LW, and dividing the sum by two. Calculation of the degree of final contribution FSC is represented by an equation as follows:

$$FSC=\{(BSC \times DW)+(BSC \times LW)\}/2$$

As mentioned above, the degree of final contribution FSC is determined as an average value of the sums of products of the three degrees of contribution, whereby a more reliable degree of contribution can be obtained. Specifically, even when an error component in any one of the three types of degrees of contribution is large, the error component is diminished by the other two types of degrees of contribution. Consequently, a more reliable, high degree of contribution can be obtained. A formula for calculating the degree of final contribution is an example and may be changed, as appropriate. For instance, all of the first, second, and third degrees of contribution are added together, and the sum may be divided by three ($FSC=\{(BSC+DW+LW)/3\}$).

Figure 10:
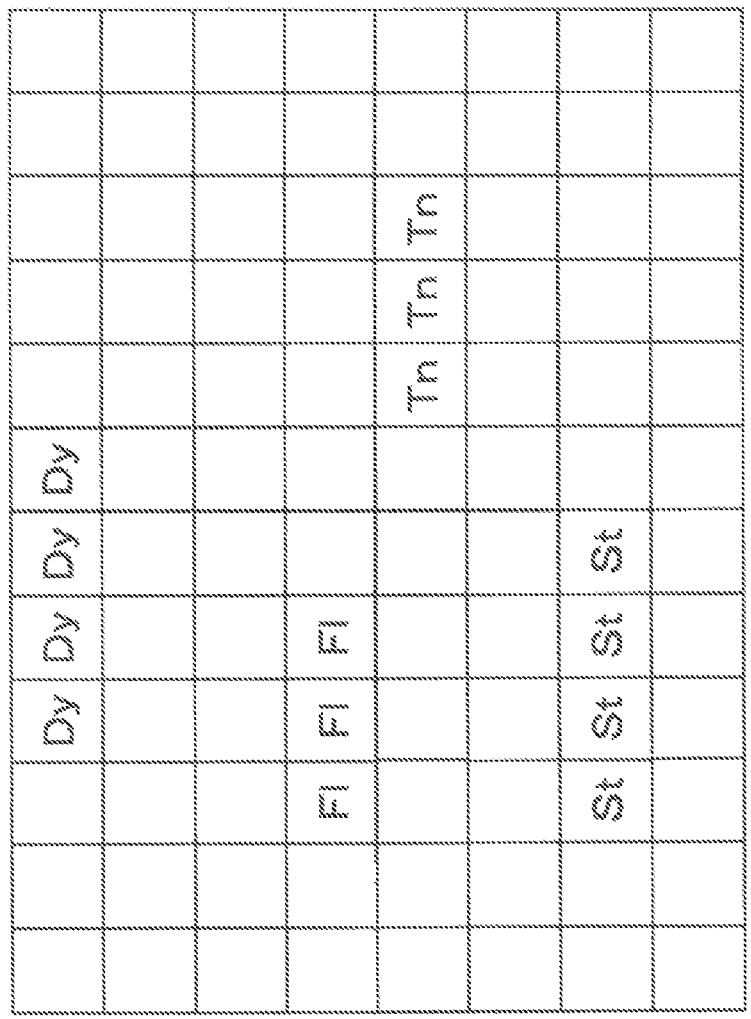
FIG. 10 is a view showing an example result of determination of a light source.

As long as the degree of final contribution FSC can be calculated, a WB gain is calculated in consideration of the degree of final contribution FSC. Specifically, a captured image is first divided into a plurality of blocks, and the types of light sources of the respective blocks are identified. The degree of reliability of the respective blocks is identified on the basis of the brightness values of the respective blocks, and the like. An additional value of reliability is calculated for each type of light source. Summated values of the respective types of light sources are taken as weighting coefficients of the respective types of light sources. For instance, the result of determination of the light source of each block is plotted as shown in FIG. 10. For the sake of simplicity, the reliability of each block is taken as one. In this case, the weighting coefficient of each type of light source corresponds to the number of blocks achieved in connection with each type of light source. Specifically, in the embodiment shown in FIG. 10, the weighting coefficient of daylight (Dy) is four; a weighting coefficient of tungsten light (Tn) is three; a weighting coefficient of fluorescent light (H) is three; and a weighting coefficient of strobe light (St) is four.

When an image has been captured through strobe illuminated photography, the weighting coefficient of strobe light among the thus-calculated weighting coefficients is multiplied by the previously-described degree of final contribution FSC. Specifically, the weighting coefficient of strobe light is corrected, as required, according to the degree of contribution of strobe light. For instance, when the degree of final contribution FSC is 0.8, the weighting coefficient of strobe light is corrected to a value determined by $4 \cdot 0.8 = 3.2$.

As long as the weighting coefficient of strobe light can be corrected, a weighted average value between the weighting coefficient of each type of the light source and the reference gain value shown in FIG. 4 is calculated. The thus-calculated weighted average value; namely, coordinates in the T space, are converted into an RGB value, whereby a WB gain is obtained. In relation to the thus-calculated WB gain, a correction component of strobe light (a reference gain value Gs for strobe light) is adjusted, as appropriate, according to the degree of contribution of strobe light. Consequently, a preferable WB gain appropriate to the degree of contribution of strobe light is obtained.

As has been described, according to the present embodiment, the degree of contribution of strobe light is determined on the basis of an actually-captured image, and a WB gain appropriate to the degree of contribution is calculated. Consequently, a more suitable WB gain can be obtained. Although in the present embodiment all of the degrees of first, second, and third contribution are calculated, a WB gain may be corrected by means of solely the degree of first contribution or the degree of third contribution. The WB gain is corrected by means of adding the thus-obtained degree of final contribution FSC to the weighting coefficient of strobe light. However, as a matter of course, another correction method may also be used. For instance, the value of a standard gain value Gs for strobe purpose may be changed according to the degree of final contribution FSC.

PARTS LIST

10 digital camera
12 aperture member
14 lens
16 CCD
18 correlated double sampling (CDS) circuit
20 amplifying, circuit (AMP)
22 analog-to-digital (A/D) converter
24 image memory
25 image processing section
26 RGB separation section
28 WB processing section
30 γ correction section
32 color correction section
34 LCD 36 timing generator (TG)
38 memory controller
40 image memory
42 compression-and-expansion circuit
44 recording medium
46 strobe device
48 CPU
50 AE/AF strobe control section
51 WB (White Balance) gain acquisition
52 degree of contribution computing section
54 memory
56 gain computing section
58 operation section
S10 has strobe light been fired
S12 ordinary processing for computing WB gain
S14 estimate degree of contribution of strobe light
S16 estimate degree of contribution of strobe light
S18 estimate degree of contribution of strobe light
S20 compute degree of final contribution
S22 compute WB gain
S23 divide captured image into blocks
S24 specify brightest block
S26 are there blocks of strobe color
S28 compute deuce of tentative contribution SBW
S30 degree of first contribution=½
S32 compute degree of tentative contribution SOW
S34 determine differences between brightnesses
S36 degree of first contribution BSC
S38 difference between typical brightness value and predetermined allowable range
S40 compute mean brightness value
S42 compare brightness values SBL
S44 degree of first contribution BSC=⅘
S46 degree of first contribution BSC=⅖
S48 degree of first contribution BSC=⅕

What is claimed:

1. A gain calculating device for calculating a white balance gain at least for an image captured through strobe illuminated photography, the device comprising:
   a block dividing unit for dividing the image captured through strobe illuminated photography into a plurality of blocks;
   an identification unit for identifying, from among the divided blocks, a highly-influenced block, which is a block presumed to have been greatly influenced by strobe light;
   a first estimation unit for estimating, as a degree of first contribution, a degree of contribution of strobe light on the basis of at least one of the position of the highly-influenced block in the image and a difference between brightness of the highly-influenced block and brightness of other blocks;
   a second estimation unit for estimating the degree of contribution of strobe light as the degree of second contribution on the basis of a distance to a subject; and
   a gain calculating unit for calculating a white balance gain from at least the degree of first contribution and the degree of second contribution.

2. The gain calculating device according to claim 1 further comprising:
   a third estimation unit for estimating the degree of contribution of strobe light as the degree of third contribution on the basis of a difference between environment brightness achieved before firing of strobe light and environment brightness achieved at the time of firing of strobe light; and
   gain calculating unit for calculating a white balance gain on the basis of at least the degree of first contribution and the degree of third contribution.

* * * * *